United States Patent [19]

Stelzenmuller

[11] Patent Number: 4,673,977
[45] Date of Patent: Jun. 16, 1987

[54] METHOD OF SPATIALLY THRESHOLDING A DISCRETE COLOR IMAGE

[75] Inventor: William K. Stelzenmuller, Morrisville, N.C.

[73] Assignee: International Business Machines Corporation, Armonk, N.Y.

[21] Appl. No.: 747,094

[22] Filed: Jun. 20, 1985

[51] Int. Cl.$^4$ .................. H04N 7/12; H04N 1/00; G06K 9/36

[52] U.S. Cl. .................. 358/133; 358/261; 382/56

[58] Field of Search .......... 358/75, 133, 260, 261; 382/22, 56

[56] References Cited

U.S. PATENT DOCUMENTS

| | | | |
|---|---|---|---|
| 4,189,711 | 2/1980 | Frank | 382/22 X |
| 4,476,495 | 10/1984 | Fujisawa et al. | 358/261 X |
| 4,501,016 | 2/1985 | Persoon et al. | 382/22 |
| 4,542,411 | 9/1985 | Imanaka et al. | 382/56 X |

*Primary Examiner*—E. A. Goldberg
*Assistant Examiner*—Patrick W. Foster
*Attorney, Agent, or Firm*—Gerald R. Woods

[57] ABSTRACT

A method is disclosed for thresholding the luminance component of color picture elements (pels) prior to compression. The method is most effective when used with discrete color images, such as documents having areas of nominally constant color. The method uses spatial information rather than histogram information to threshold the image data. Each scan line is defined as having a series of pel runs. A pel is considered to be in a run if its luminance is within a certain range of an average luminance based on preceding pels. Each run may end in a transition region wherein the luminance of each pel differs from the luminance of the preceding pel by more than a predetermined amount. Where a transition region is found, a local threshold is set based on the average luminance of the preceding run and of the following pel. All pels in the transition region are assigned a luminance value equal either to the average luminance of the preceding run or the actual luminance of the following pel.

8 Claims, 10 Drawing Figures

FIG. 1
```
10 10 10 10 10 10 10 10  10 10
10 10 10 10 10 10 10 10  10 10
10 10 50 50 50 50 50 50  10 10
10 10 50 50 50 50 50 50  10 10
10 10 50 50 50 50 50 50  10 10
10 10 50 50 50 50 50 50  10 10
10 10 10 10 10 10 10 10  10 10
10 10 10 10 10 10 10 10  10 10
```
FIG. 2
```
10  9 11 10 10 11  9 10 10 11
10 15 25 28 26 23 25 23 14 10
11 23 38 40 37 35 37 39 24 10
 9 24 39 50 51 49 51 38 25 11
10 25 37 51 50 50 49 37 23  9
11 23 38 37 39 38 37 35 24 10
10 16 25 23 24 23 25 26 14 11
10 11  9 11 10 10 11 10 10 11
```
FIG. 3
```
5 5 5 5  9 12 12 12 12
5 5 5 5  9 12 12 12 12
5 5 5 5  7 12 12 12 12
5 5 5 5  8 12 12 12 12
```
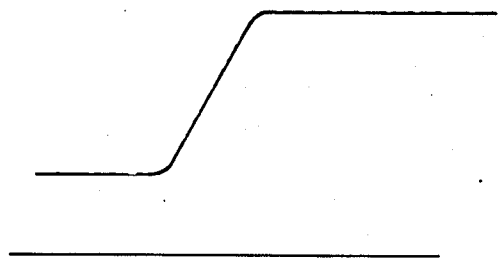
FIG. 4
```
5 5 5 5 9 9 5 5 5
5 5 5 5 9 9 5 5 5
5 5 5 5 7 8 5 5 5
5 5 5 5 8 8 5 5 5
```
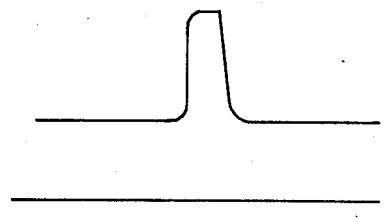

METHOD OF SPATIALLY THRESHOLDING A DISCRETE COLOR IMAGE

BACKGROUND OF THE INVENTION

The present invention relates to image processing and more particularly to a spatial thresholding method for thresholding the luminance component of color pels in a discrete color video image, prior to compression.

Because travel costs are rising and because a traveler's time in transit can seldom be used productively, there is an increasing interest in the use of video conferencing as an alternative to face to face business meetings between people from different locations. In a typical video conferencing system, people in different cities or even different countries meet in special video conferencing rooms at their respective home locations. Each room normally includes a room camera for capturing a wide angle view of the people, a document camera which can be focussed on letters, drawings or other documents, a room monitor for permitting people in one room to see those in the other, and a document monitor for viewing documents being presented in the other room. Each room also includes one or more microphones and speakers. Audio/video communications between the two rooms are established over conventional telecommunication links, such as leased or switched telephone lines or satellite communication channels.

The simplest form of video conferencing system is one which uses conventional video equipment and data transmission techniques to provide what is referred to as full-motion video conferencing; that is, video conferencing in which the people in one room can watch those in the other room move about during the teleconference. The communication costs for conventional full-motion video conferencing are high. A considerable amount of data must be transmitted at high rates, making it necessary to use a transmission medium having a high bandwidth. Communications costs are generally proportional to bandwidth. Therefore, any requirement for a high bandwidth runs counter to one of the primary reasons for using video conferencing to begin with, namely, to reduce costs associated with the conduct of meetings.

To reduce communications costs, freeze-frame video conferencing techniques may be employed. The video image captured by a room camera is updated only periodically, either at fixed intervals or on command of an operator. People at a receiving location see the same "frozen" room image between updates. Audio or voice signals are transmitted on a real time basis so that there are no perceptible delays in voice communications. Document images are updated only when the person presenting a document pushes a "send" button in the video conferencing room.

There are two basic ways to reduce bandwidth requirements in a freeze-frame video conferencing system. One way is to reduce the amount of data that must be sent in order to recreate an acceptable image at the receiving location. The other way is to use a lower bandwidth and simply take longer to transmit the data required to reconstruct an acceptable video image at the receiving location.

The time required to transmit necessary image data is important in any freeze-frame video conferencing system since it determines the frequency with which images can be updated during the course of a teleconference. If meeting participants must sit and wait for an expected video image, those participants are likely to become irritated and restless, reducing the effectiveness of the teleconference.

In a freeze-frame video conferencing system designed to capture, transmit and display only monochrome images, it is well known to reduce transmission time requirements by compressing the amount of data to be transmitted. There are two basic types of data compression techniques which are used for monochrome video data. The first type of technique is used most often in facsimile systems designed for transmitting document images. Facsimile data compression techniques assume that all picture elements or pels in a video image are intended to be either black or white. When a video image is captured by a video camera, every pel in that image is assigned either a black value or a white value depending upon whether the gray value of the pel is greater than or less than a threshold value. A document thresholded in this manner includes long runs of black or white pels. Known run length encoding techniques can be used to reduce the amount of data which must be transmitted in order to represent those runs of pels.

The second major type of monochrome data compression technique is one which is used with continuous gray scale images; that is, images having many different shades of gray. One known continuous gray scale technique requires that the value of each pel in the image be predicted using the known values of one or more pels in the preceding scan line and one or more preceding pels in the same scan line. The actual value of the subject pel is compared to its predicted value. The difference between the predicted and actual values is transmitted.

There as been a good deal of interest in the use of color video in video conferencing systems because information presented in the form of a color image is generally considered easier to comprehend than the same information presented in the form of a monochrome or gray scale image. However, the use of color video is not without problems. More data is required to define a pel in a color image than a pel in a monochrome image. A color includes both luminance (brightness) and chrominance (color) components while a monochrome pel includes only a luminance component. Techniques used successfully in monochrome videoconferencing systems are not necessarily suitable for color video conferencing systems.

When each pel in a color image is broken down or decomposed into its luminance and chrominance components, the continuous gray scale technique described above can be used on continuous color images by independently compressing the luminance and chrominance components. This technique works well for continuous color images in which the luminance and chrominance of pels vary continuously. Images of people and objects fall into this category. However, the gray scale technique does not produce optimum compression for discrete color images in which the luminance and chrominance of pels remain nominally constant throughout relatively large, well defined areas. Also, facsimile techniques are completely unsuitable since such techniques would assign either black or white value to the luminance of each pel. A new technique is needed to compress the luminance component of discrete color images.

SUMMARY

It has been found that color images occurring in video conferencing systems can be divided into two major classifications, continuous color images and discrete color images. Continuous color images are images in which the luminance and chrominance of pels vary continuously. Images of people and objects fall into this category. Discrete color images are images in which the luminance and chrominance of pels remain at least nominally constant throughout relatively large, well defined areas. Many foils, charts, graphs and general business documents fall into the category of discrete color images or documents.

If the pels in a color image are decomposed into their luminance and chrominance components, the luminance or brightness components of those pels can be compressed independently of the chrominance or color component using a spatial thresholding technique to be described. In the Y-I-Q system of color notation, the luminance component of a pel is identified as the Y component. The chrominance component is a combination of the I and Q components. The present invention relates to a spatial thresholding technique to be used with the luminance or Y component.

According to the present invention, runs of pels in an image scan line are established by comparing the luminance of a given pel with an intermediate average luminance of preceding pels. The run ends at that pel which has a luminance which differs from the intermediate average luminance by more than an absolute threshold value. The method includes the step of determining whether a transition region follows an established run. The luminance of a pel in a possible transition region is compared with the luminance of the immediately preceding pel. A transition region includes all pels beginning with the first pel following an established run and ending at the first pel which has a luminance differing from the luminance of the preceding pel by less than an algebraic limit. All pels within an established run are assigned a final luminance value as a function of the actual luminances of the pels in the run. A local threshold is established for each transition region as a function of the assigned final luminance value for the preceding run and the actual luminance of the first pel following the transition region. All pels within the transition region are thresholded either to the final luminance value for the preceding run or to the actual luminance value for the first pel following the transition region.

The end result of the spatial thresholding method is a string of luminance data consisting of long runs of constant luminance values. The long runs can be readily compressed using known run length encoding techniques.

BRIEF DESCRIPTION OF THE DRAWINGS

While the technical description is followed by claims that particularly point out and distinctly claim that which is regarded as the present invention, details of preferred embodiments of the invention may be more readily ascertained from the technical description when read in conjunction with the accompanying drawings, wherein:

FIG. 1 is a numerical representation of ideal luminance values resulting from the scanning of a rectangular symbol on a white background;

FIG. 2 is a numerical representation of actual luminance data which typically results when such a symbol is scanned;

FIG. 3 is a representation of luminance data at a transition between two areas of different colors;

FIG. 4 is a representation of luminance data generated when a thin line is scanned;

TECHNICAL DESCRIPTION

FIG. 1 represents luminance values ideally generated when a colored rectangular symbol on a light background is scanned. Ideally, every pel in the rectangular symbol 12 has a constant luminance value, shown arbitrarily as a value of 50 while every pel in the background region has a different constant luminance value, shown arbitrarily as a value of 10. Also ideally, there are no transitions between the background and symbol regions.

While FIG. 1 shows ideal luminance values, FIG. 2 shows the luminance values which more typically result from the scanning of a colored rectangular symbol on a light background. Actual symbol luminance values approach ideal luminance values only in a small region 14 at the center of the symbol area. The transition between background and symbol areas extend over a span of several pels in a transition region 16 separating region 14 and an actual background region 18. The luminance values for pels within the transition region 16 change gradually but not uniformly as the region 14 is approached. Further, the pel values in the region 14 and in actual background region 18, are only nominally constant. The slight variations in nominally constant luminance values may be the result of image sampling or may accurately reflect the actual appearance of a document. Nevertheless, such variations are undesirable since they hinder data compression. Similarly, the existence of the transition region 16 hinders data compression.

The present invention is a spatial thresholding technique which operates on typical luminance values of the type represented in FIG. 2 and, through a series of thresholding operations, assigns new values to produce data more closely approximating the ideal luminance values shown in FIG. 1. As will be described in more detail later, the technique eliminates any transition regions and causes all pels in a transition region to be thresholded to the value of an adjacent (preceding or following) run.

In processing pels in an apparent transition region, a distinction must be made between pels which are actually in a transition between two regions of different luminance values as illustrated in FIG. 3, and pels which actually form a thin graphics line, as illustrated in FIG. 4. The pels in a transition between regions of different luminance must be thresholded to the luminance of one of the two adjoining regions. Pels in a thin graphics line, on the other hand, must not be thresholded to the luminance of either of the adjoining regions or the line will simply disappear from the image. This decision cannot be made from histogram information; the thresholding decision must be made from spatial information.

Figure 5:
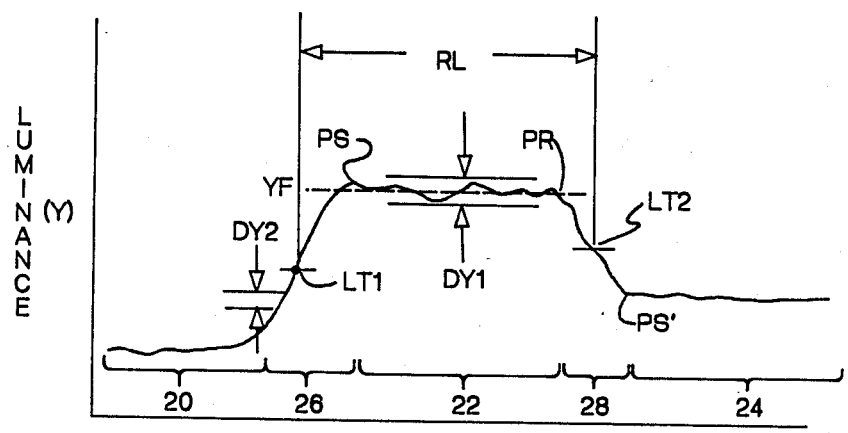
FIG. 5 is the waveform of actual luminance data taken over a small portion of a scan line.

FIG. 5 represents typical luminance values over a short scan line segment. The segment includes three regions 20, 22 and 24 having relatively constant luminance values and two transition regions 26 and 28 separating the three regions of relatively constant values.

According to the present invention, a run of pels includes a given pel if the absolute difference between the luminance of the given pel and an intermediate luminance is less than a first predetermined limit or threshold. The first predetermined limit is represented by the variable DY1 in FIG. 5. The average luminance could be based on all pels already found to be in the run. For computational reasons, however, a preferred embodiment calls for the intermediate average to be based on a fixed number of luminance values where the fixed number is a power of two. A preferred fixed number is eight luminance values. When a run has been defined, the luminance values for all pels in the run are set at a final luminance value obtained by averaging the actual luminances of all of the pels in the run without regard to the length of the run.

A test for transition regions between succeeding runs is performed by comparing the luminance of a given pel with the luminance of the preceding pel. If the luminance of a given pel differs by more than a predetermined algebraic amount, the transition region is defined as including the given pel. The algebraic difference is illustrated as the variable DY2 in FIG. 5. The transition region ends at the first pel having a luminance value within the range of the algebraic difference. For example, if DY2 is assumed to be four and pel luminance values have been increasing in a transition region, the transition region includes any pel having a luminance value at least four greater than the luminance of the preceding pel.

When a transition region has been defined, a local threshold is established by averaging the final luminance value already assigned to the preceding run and the actual luminance of the first pel following the transition region. All pels in the transition region are thresholded to one of the two luminance values which are used in calculating the local threshold. For example, FIG. 5 shows two local thresholds, LT1 for an increasing transition region 26 and LT2 for a decreasing transition region 28. In the transition region 26, all pels having luminance values less than LT1 would be thresholded to the final run luminance value assigned to run 20. All pels having luminance values greater than LT1 would be assigned a luminance value equal to the luminance of pel PS, the first pel following the transition region 26. When the pels in transition regions at either end of a run have been thresholded, the run length RL of that run is redefined to include all pels between the two local thresholds.

Figure 6:
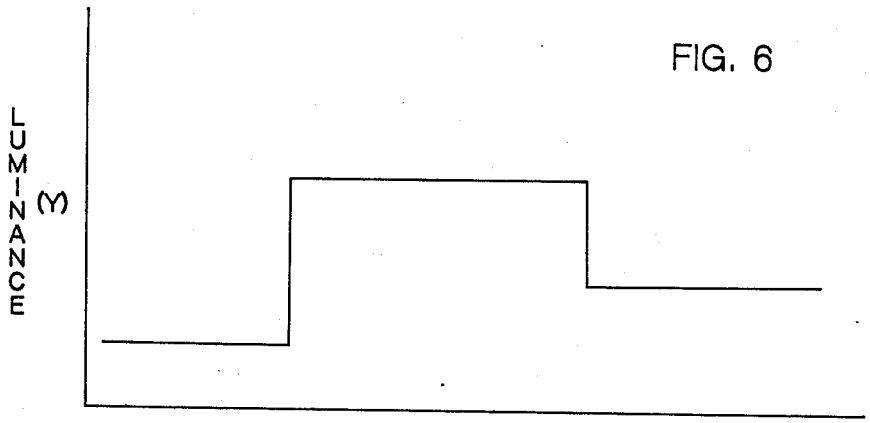
FIG. 6 is a waveform of the luminance data shown in FIG. 5 after spatial thresholding is performed.
Figure 7A:
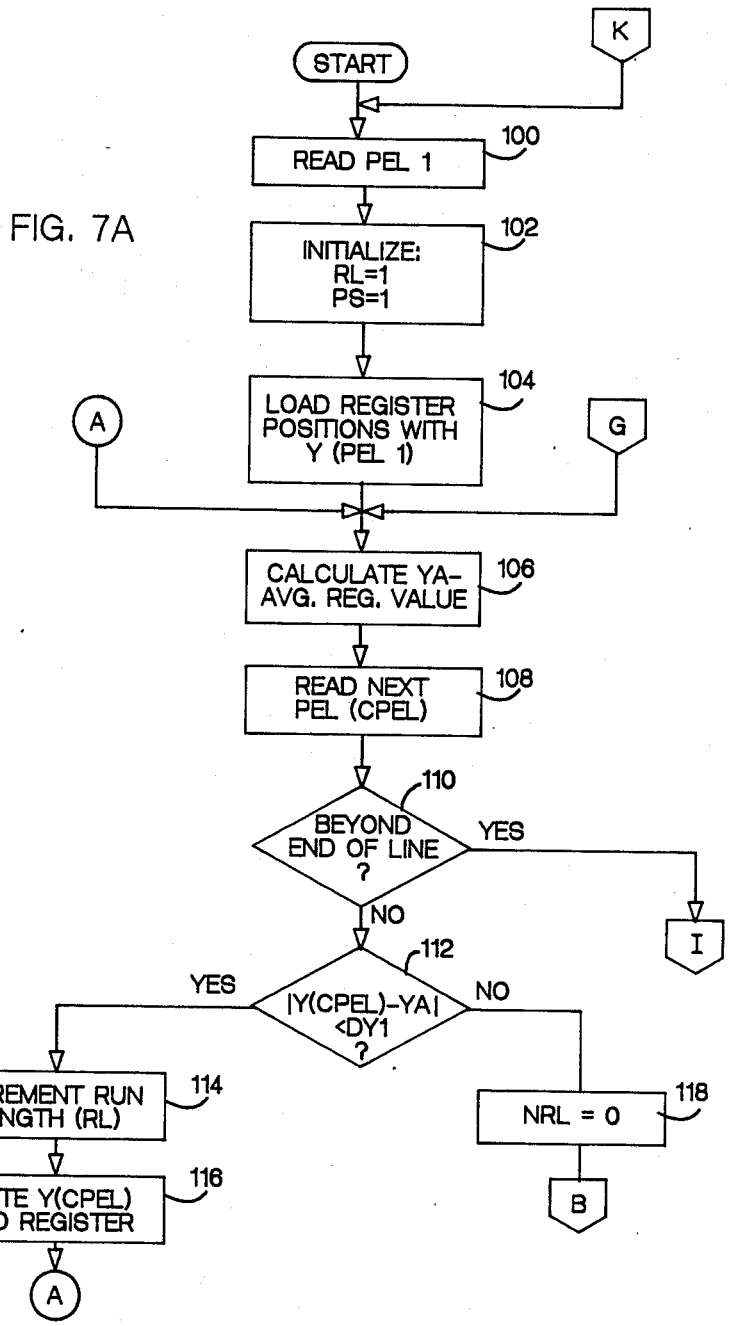
FIG. 7, consisting of FIGS. 7A through 7D taken together, is a flow chart of a preferred embodiment of a spatial thresholding technique incorporating the present invention.
Figure 7B:
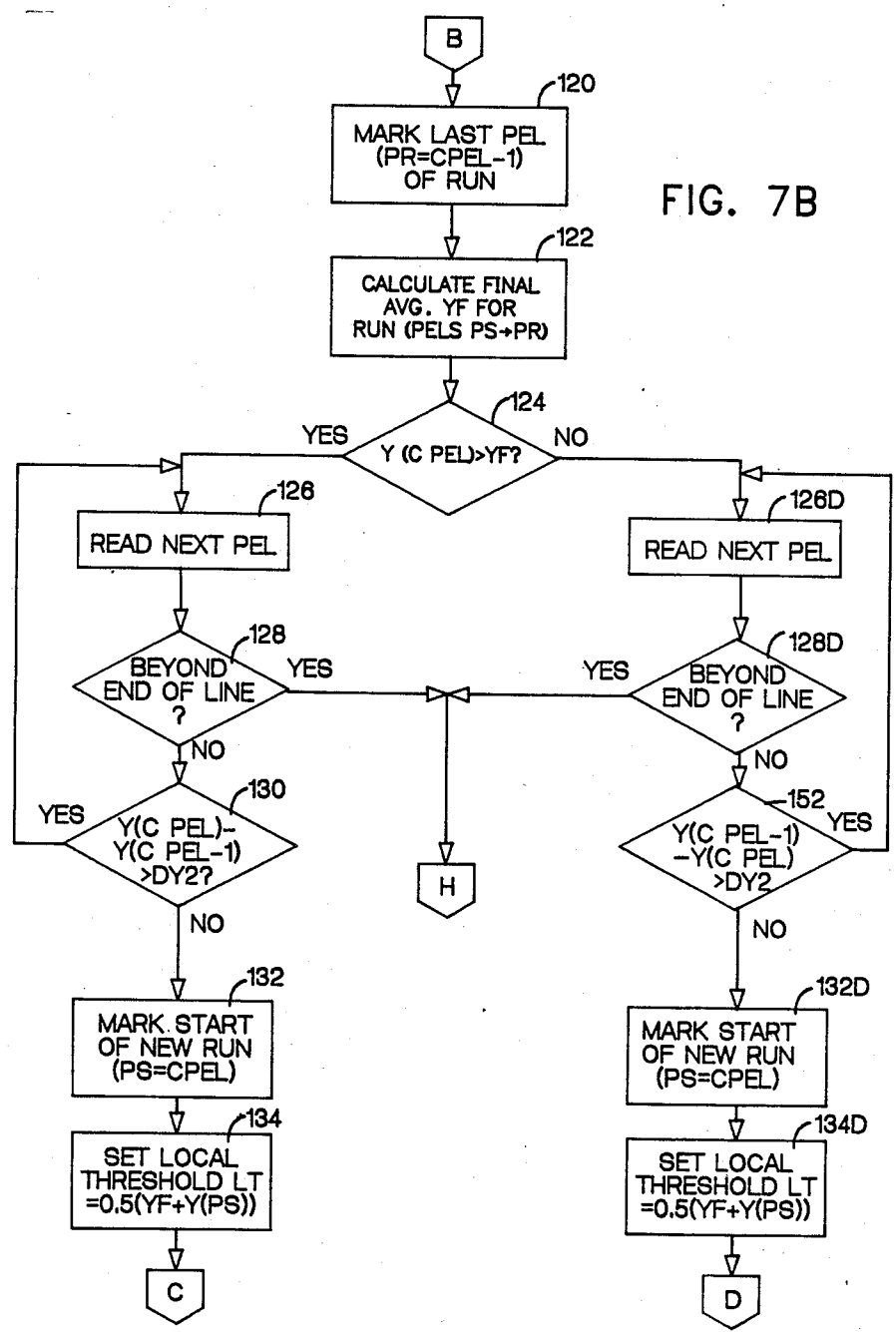
Figure 7C:
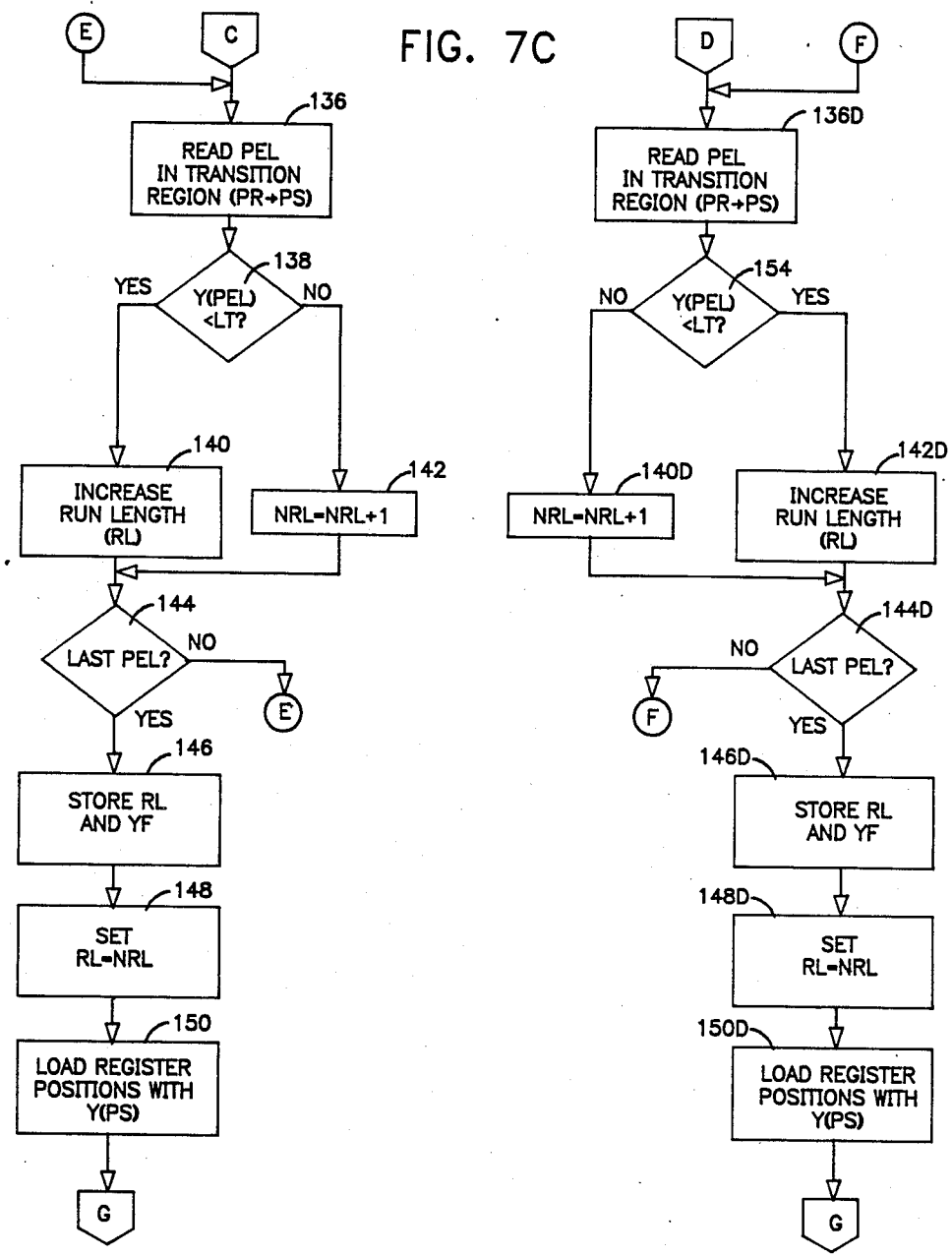
Figure 7D:
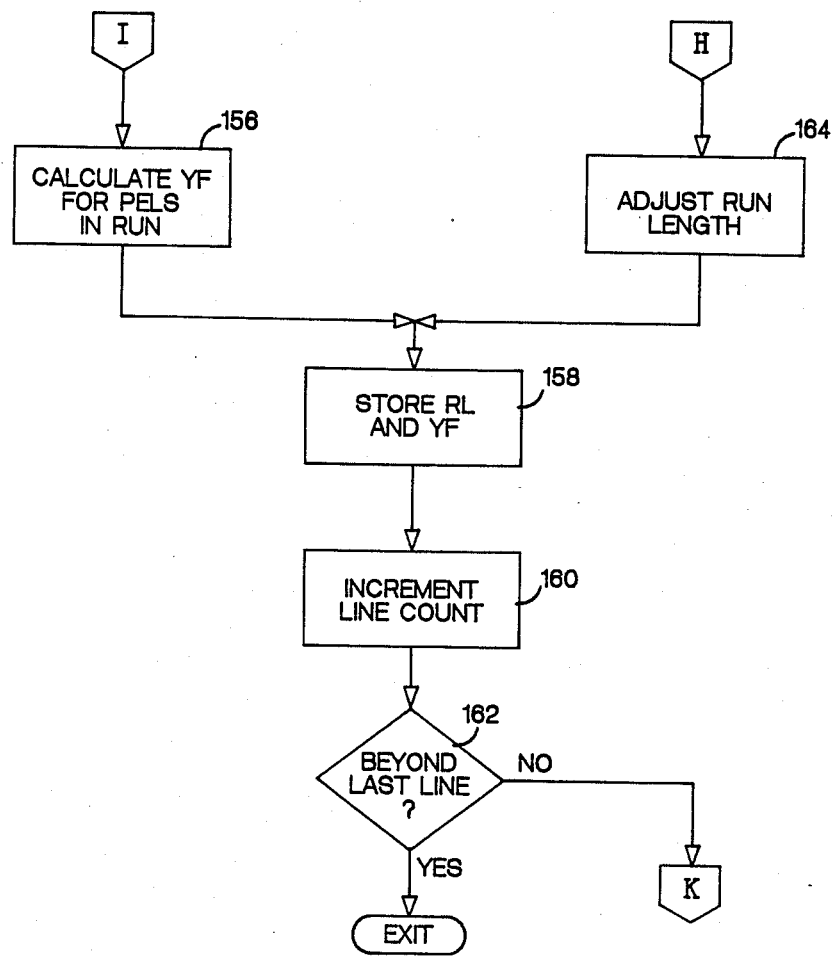

As shown in FIG. 6, applying the spatial thresholding technique described briefly above to actual luminance data produces consecutive runs of pels. Within each run, each pel has the same luminance value. The transition regions between runs are eliminated with any run-to-run change in luminance values occurring as a step function. These long runs of constant value pels can readily be compressed using known one dimensional run length encoding techniques to reduce the amount of data which must be transmitted in order to define the scan line of the video image.

FIG. 7, consisting of FIGS. 7A–7D, is a detailed flow chart of one embodiment of the spatial thresholding technique described generally above. The spatial thresholding operations are begun by reading the luminance value of the first pel (block 100) in the first line of the image field. Variables are set to initial values (block 102) at the beginning of each scan line. A run length variable RL is set to 1. Pel position variable PS representing the first pel in the run is set to 1 at the beginning of each scan line.

In a preferred embodiment, the actual luminance value for the first pel is loaded into all eight positions (block 104) of a luminance average register. An intermediate average luminance YA is calculated (block 106) based on the contents of the register. Of course, at the start of a scan line, the intermediate average luminance YA is equal to the actual luminance Y of the first pel. The luminance value of the next or current pel CPEL is read (block 108) and the check is made (block 110) to determine whether the current pel is beyond the end of the scan line. On the first iteration of the program, a negative result is obviously obtained. An equality test is performed (block 112) by determining whether the absolute difference between the luminance of the current pel and the intermediate average luminance YA is less than a predetermined threshold value DY1. If the absolute difference is less, the current pel CPEL is included in the run. The run length variable RL is incremented (block 114) and the luminance value for the current pel CPEL is written into the average register (block 116) where it replaces the oldest luminance value in that register. At this point, the program returns to block 106 where a new luminance value YA is computed based on the register contents. Since the register holds eight luminance values, the averaging calculation is performed simply by adding all values currently contained in the register and shifting the results right two places to perform a division by eight.

An operations loop consisting of blocks 106, 108, 110, 112, 114 and 116 is repeated each time operation 112 shows that the absolute difference between the luminance value for the current pel and the current YA value is less than the threshold value DY1. At each repetition, the run length variable RL is incremented, the luminance value of the current pel replaces the oldest luminance value contained in the average register and a new average luminance value YA is calculated.

When a negative result is obtained at step 112, indicating that the luminance value for the current pel differs from the average luminance value YA by more than the absolute value of DY1, an NRL variable is set to 0 (block 118). This variable is used to adjust final run length in a way to be described in more detail later.

The last pel PR in the run is identified (block 120) as occurring at the pel position CPEL-1. A final run luminance value YF is calculated (block 122) for all pels in the run; that is, all pels occurring at pel positions beginning with pel position PS and ending with pel position PR.

A type-of-transition test (block 124) is performed to determine whether the luminance values in the transition are increasing or decreasing. The test consists of comparing the luminance of the current pel CPEL with the final run luminance YF calculated in the preceding step. If the luminance of the current pel is greater than the final run luminance value, an increasing transition is indicated.

Assuming an increasing transition is indicated, an attempt is made to read the luminance value for the next pel in the scan line (block 126) and a check is made to determine whether the pel position is actually beyond the end of the scan line (block 128). Assuming it is not, the luminance value for the preceding pel is subtracted from the luminance value for the current pel and the resulting difference is compared to a threshold value DY2 (block 130). If the difference is greater than the threshold value, the current pel is included within the transition region.

Steps 126, 128 and 130 are repeated either until the attempt to read the next pel shows that the end of the scan line has already been reached or until the luminance value for the next pel is found not to exceed the luminance value for the preceding pel by the amount of the threshold DY2. When the latter situation occurs, the value of the variable PS is set equal to the variable CPEL to define the pel position of the first pel following the transition region, which is also the first pel in the next potential run. The last pel in the transition region (PS-1) is marked (block 132) and a local threshold LT is set for the transition region (block 134) by taking the average of the final run luminance value YF for the preceding run and the actual luminance of the first pel PS following the transition region.

At this point, a series of operations are begun to determine whether the luminance value for each pel in the transition region should be set equal to the final run luminance YF or to the actual luminance of the pel PS. The actual luminance of a pel in the transition region is read (block 136) and is compared (block 138) to the calculated local threshold. In an increasing transition region, any pel having a luminance value less than LT causes the run length variable RL to be incremented (block 140) while any pel having a luminance value greater than LT causes a different variable NRL to be incremented (block 142). If a check (block 144) shows that the last pel in the transition region has not been processed, the operations are repeated, beginning with the reading of the luminance of the next pel in the transition region.

When the last pel in the transition region has been processed, the current value for the run length RL and the final luminance value YF are stored (block 146). The run length variable RL is then set equal (block 148) to the variable NRL resulting from operation 142. All eight positions of the average luminance register are loaded (block 150) with the actual luminance value for the first pel PS in the next run. The program then returns to operation 106 in which a new intermediate luminance average is calculated for use in defining the next run.

The previously described operations defining a run and a subsequent transition region are repeated. It will be noted that the run length variable RL for the second and subsequent runs on a scan line is not necessarily set to zero. The initial value of RL for the second and subsequent runs is set equal to NRL. If an increasing transition region preceded the run, the NRL variable represents the number of pels in the transition region having luminance values greater than the local threshold. As a result, the final run length includes all pels between successive local thresholds.

If step 124 had indicated that the transition region had been a decreasing one, a parallel set of operations would have been performed to define the extent of the decreasing transition region and to threshold the luminance values for pels within that region either to the final run luminance for the preceding run or to the actual luminance of the first pel following the decreasing transition region. Most of the operations performed in the operations for a decreasing transition region are identical to the previously described operations performed for an increasing transition region. Where a specific operation performed in a decreasing transition region is identical to a corresponding operation performed in an increasing transition region, that identity is indicated by appending the character D to the reference numeral for the corresponding operation. For example, the step 126D of reading the next pel in a decreasing transition region is identical to the step 126 performed in an increasing transition region.

A few operations in the two parallel sets differ slightly. In a decreasing transition region, the end of line test 128D is followed by an inequality test 152 in which the luminance for the current pel is subtracted from the luminance of the preceding pel. The result is compared to the threshold value DY2. One other operation differs slightly from its counterpart. In determining whether a specific pel in the decreasing transition region is to have its luminance value thresholded to the final run luminance value for the preceding run or to the luminance value of the first pel PS following the decreasing transition region, a check is made (block 154) to determine whether the luminance value of that pel is greater than calculated local thresholds for the decreasing transition region. If it is not, the NRL variable is incremented (block 140D). If it is, the run length variable RL is incremented (block 142D), thereby increasing the length of the previous run.

The series of operations described above will be repeated along the length of the scan line until any of operations 110, 128 or 128D indicate that the last pel in the scan line has been processed. If operation 110 indicates that the last pel in the scan line has been processed, the last pel occurred in the scan line within a run of nominally constant value pels. In that situation, a final run luminance value is calculated (block 156) based on all of the pels in this final run. The run length RL and the calculated final run luminance YF for the final run are stored (block 158) and the variable identifying the next scan line to be processed is incremented (block 160). A check is then made (block 162) to determine whether the last scan line in the image field has already been processed. If it has not, the entire series of operations beginning with operation 100 are repeated beginning with the first pel of the next scan line.

If either of the operations 128 or 128D indicated that an end-of-line condition existed, that means that the scan line ended within an increasing or decreasing transition region. Under those conditions, the run length for the preceding run is adjusted (block 164) to include all pels in the concluding transition region.

An image scan line processed in accordance with the previously described steps is defined by successive runs of pels having constant luminance values. Each run is defined by two variables. The first variable is the length of that run. The second variable is the final run luminance or YF value assigned to that run. Thus, each scan line is compressed directly in one dimension through the described operations.

The process described above is continued until all scan lines have been processed. The entire process may then be repeated in the second dimension. That is, if the luminance data had been processed row by row, it may then be processed again by the same program column by column. Processing the data in both dimensions will threshold transition pels from both vertical and horizontal transition regions.

Known two dimensional data compression techniques could be used to further compress the data produced by the method described above.

While there has been described what are considered to be preferred embodiment of the present invention, variations and modifications therein will occur to those skilled in the art. Therefore, it is intended that the appended claims shall be construed to include not only the preferred embodiment but all variations and modifications that fall within the true spirit and scope of the invention.

I claim:

1. A method of processing a line of image data resulting from the sampling of an NTSC composite color video signal and the subsequent decomposition of resulting pels into luminance and chrominance components, said method comprising the steps of:

establishing a run of pels by comparing the luminance of a given pel with an intermediate average luminance based on the actual luminances of preceding pels, said run ending at that pel having a luminance which differs from the intermediate average luminance by more than a predetermined absolute limit;

assigning a final luminance value for an established run as a function of the actual luminances of pels within the run;

determining whether a transition region follows an established run by comparing the luminance of successive pels with the luminance of the immediately preceding pel, any said transition region including these pels beginning with the pel following an established run and ending at the first pel having a luminance which differs from the luminance of the preceding pel by less than a predetermined algebraic limit;

establishing a local threshold for any transition region as a function of the assigned final luminance value for the established run and the actual luminance of said first pel;

assigning either the final luminance value or the actual luminance of said first pel to all pels in the transition region as a function of the actual luminances for those pels relative to the local threshold; and repeating the preceding steps until the last pel in the line is processed.

2. A method as set forth in claim 1 wherein the final luminance value assigned to a run is based on the average luminance value of all pels in the run.

3. A method as set forth in either of claims 1 or 2 wherein the local threshold for a transition region is the average of the final luminance value for the established run and the actual luminance of said first pel.

4. A method as defined in claim 2 wherein the intermediate average value is obtained by averaging a fixed number of luminance values, regardless of the length of the run, said fixed number being a power of 2.

5. A method of sampling a line of image data resulting from the sampling of a video signal and the subsequent digitization of resulting pels, said method comprising the steps of:

establishing a run of pels by comparing the digital value of a given pel to an intermediate average digital value based on the actual digital value of preceding pels, said run end with the pel having a digital value which differs from the intermediate average digital value by more than a predetermined absolute limit;

assigning a final digital value to each pel in the established run as a function of an average of at least certain pels in the run;

determining whether the run is followed by a transition region by comparing the digital value of a given pel with the digital value of the preceding pel, said transition region beginning with the pel following the previously established run and ending at the first pel having a digital value which differs from the digital value of the preceding pel by less than a predetermined algebraic limit;

establishing a local threshold for the transition region as a function of the final digital value for the previously established run and the actual digital value of said first pel;

thresholding each pel in the transition region to the final digital value or to the actual digital value of said first pel as a function of the actual digital value of each pel relative to the local threshold; and repeating the preceding steps until the last pel in the line is processed.

6. A method as set forth in claim 5 wherein the final digital value assigned to a run is based on the average digital value of all pels in the run.

7. A method as set forth in either of claims 5 or 6 wherein the local threshold for a transition region is the average of the final digital value for the established run and the actual digital value of said first pel.

8. A method as defined in claim 5 wherein the intermediate average value is obtained by averaging a fixed number of luminance values, regardless of the length of the run, said fixed number being a power of 2.

* * * * *